RECORDER FOR PRODUCING COMPOSITE DIFFRACTION GRATING PATTERN

Filed May 18, 1966 2 Sheets-Sheet 1

HARVEY O. HOADLEY
INVENTOR.

BY Robert F. Crocker
Daniel E. Snagow
ATTORNEY & AGENT

RECORDER FOR PRODUCING COMPOSITE DIFFRACTION GRATING PATTERN

Filed May 18, 1966 2 Sheets-Sheet 2

HARVEY O. HOADLEY
INVENTOR.

BY Robert F. Crocker
Daniel E. Sragow
ATTORNEY & AGENT

United States Patent Office 3,407,405

Patented Oct. 22, 1968

3,407,405

RECORDER FOR PRODUCING COMPOSITE DIFFRACTION GRATING PATTERN

Harvey O. Hoadley, Rochester, N.Y., assignor to Eastman Kodak Company, Rochester, N.Y., a corporation of New Jersey Filed May 18, 1966, Ser. No. 551,054
9 Claims. (Cl. 346—108)

ABSTRACT OF THE DISCLOSURE

Apparatus for recording digital data in the form of a plurality of superimposed but distinct single frequency diffraction gratings, the gratings being formed by interference patterns created between reference and "digit" beams derived from a laser source. Electro-optical phase altering cells and bi-refringent plates or prisms are used to control selectively the individual "digit" beams.

This invention relates to information storage and retrieval systems, and particularly to a method of digital data recording in which superimposed grating patterns are exposed onto a photographic film.

With digital computers getting larger and demanding greater information storage capacity, there has arisen a need for an information storage medium which takes a minimum amount of space. A conventional method of storing binary digital information has been on punched cards. Each presence or absence of a hole in the card is indicative of a binary bit. When it is attempted to place more holes in a punched card in order to store more information, the card becomes very fragile and even so does not have the desired large capacity.

Digital information has also been stored on photographic film with dark spots being indicative of binary bits. This had allowed greater storage capacity than punched cards because of the great resolving power of photographic film but has several disadvantages. First, as the dots on the film are made smaller in order to increase the information storage per unit area on the film, the accuracy with which the film has to be positioned increases. Furthermore, as the dots are made smaller, the read out device has increasing difficulty in distinguishing between a dot and a speck of dirt, and between a scratch and a blank space. Another prior art system of storing digital information on photographic film uses diffraction gratings instead of dots and blanks. In this type of system a diffraction grating of one frequency is used to represent a binary 1, and a diffraction grating of another frequency is used to represent a binary 0. The diffraction gratings are recorded on film. When it is desired to read out the recorded information monochromatic light is directed through the recorded gratings, and the first order images from the gratings are detected to determine which bit has been recorded. This system helps to reduce the problem of distinguishing between scratches and dust, and information, but it does not increase the information capacity of the film, and extremely accurate record positioning is still required.

In U.S. Patent 3,312,955 issued on Apr. 4, 1967, to R. L. Lamberts and G. C Higgins, there is disclosed a method and apparatus for recording binary information on film as superimposed diffraction gratings, each grating corresponding to a binary bit, e.g., the presence or absence of a particular single frequency grating being indicative, respectively, of the binary values "1" and "0." This type of record has the additional advantage of being able to more fully utilize the resolving power of the film, i.e., it permits more information to be stored per unit area. This is brought about because in the same area of the film previously used for one binary bit there are now recorded several binary bits. There is not need for increased accuracy of the positioning mechanism, since the total information in the superimposed gratings is spread throughout the whole space occupied by the gratings.

It is an object of this invention to provide new methods and apparatus for recording superimposed diffraction gratings. This object is realized by providing a source of coherent radiation, using various control means to split the radiated beam into a plurality of individual beams, and directing each of said individual beams to a common area, but at different angles in order to form an interference pattern, to which a photosensitive member can be exposed to form a composite diffraction grating.

Other objects and advantages will appear from the following description, reference being made to the accompanying drawings wherein.

As is well known, an interference pattern can be formed by directing two similarly polarized beams of monochromatic light to the same area but at different angles. The interference frequency is dependent upon the angle between the two beams and upon the wavelength of the light according to the following relationship:

$$F = \frac{\sin \theta}{\lambda}$$

where F is the frequency in lines/mm., $\theta$ is the angle between the beams, and $\lambda$ is the wavelength of the light in mm. If more than two beams interfere, a composite interference pattern is produced since each beam interferes with each other beam. In recording digitally encoded data, it is desired that there be a single comparison beam, and a plurality of digital beams each of which is selectively controlled so that a composite interference pattern is formed which is indicative of the digital beams being used. If each of the digital beams makes a small angle with each other digital beam but makes a relatively large angle with the comparison beam, the interference frequency due to the interaction of the digital beams will be so low as to be negligible. It is desirable that the angle between the two extreme digital beams be less than the angle between the comparison beam and the first digital beam.

Figure 1:
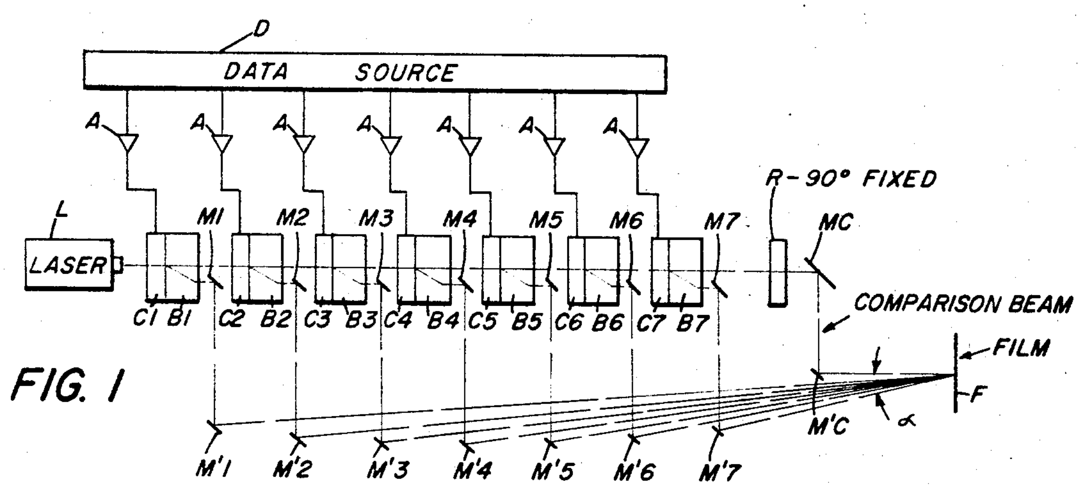
FIG. 1 shows schematically an embodiment of the invention using plane parallel birefringent plates.

Referring to FIG. 1, the beam from laser L is directed toward a control device consisting of a Pockels cell C1 and a birefringent plate B1. As shown, plates B are plane parallel birefringent plates. The Pockels cell selectively changes the polarization of the laser beam from plane to elliptical in dependence on its energization. Each of the serially positioned Pockels cells is driven by a driver amplifier A which is in turn triggered by data source D. The birefringent plate B1 splits the elliptically polarized beam into an ordinary ray which goes straight through and an extraordinary ray, which is deflected and takes a different path. The relative strengths of the ordinary and extraordinary rays are determined by how far the polarization of the beam has been changed. If the beam is polarized in the direction of the crystal axis, there will be no extraordinary ray. If the beam is polarized 90° from the crystal axis, there will be no ordinary ray. Anywhere between these two extremes the beam will be split between the ordinary and extraordinary rays.

In the case of a plane parallel birefringent plate as shown in FIG. 1, the two rays have parallel paths. The birefringent plate separates the light coming into it into two components, each polarized 90° from the other. If the beam coming into the birefringent plate is polarized along one of the axes of the plate, only one of the rays will emerge from the plate. If the rays coming into the plate are circularly polarized, the ordinary and extraordinary rays will have equal intensity. It can therefore be seen that the relative intensities of the ordinary and extraordinary rays can be varied by changing the ellipticity of the polarization of the beam. This is exactly the function of the Pockels cell.

Therefore, assuming that the energization of Pockels cell C1 is such that the source beam passing therethrough is elliptically polarized at some angles from both axes of plate B1, a portion of the beam passes straight through plate B1 as an ordinary ray and is directed straight into the next control device which consists of Pockels cell C2 and birefringent plate B2. At the same time the remaining portion of the source beam, which emerges from plate B1 as the extraordinary ray, is reflected by mirrors M1 and M'1 to photosensitive surface F, which is in this case a photographic film. The other control devices C2B2, C3B3, C4B4, C5B5, C6B6, and C7B7 operate in exactly the same way, their respective mirrors directing the extraordinary ray from each birefringent plate along a respective digit beam path intersecting the comparison beam in the recording area at a predetermined angle so that the interference of each extraordinary ray beam and the comparison beam will produce a respective line grating pattern of individually-distinct spacial frequency, as noted above.

However, as the comparison beam passes through the control devices, it emerges from each as the ordinary ray and so is polarized 90° relative to each of the digit beams which have emerged as extraordinary rays. Therefore, in order to produce the desired interference patterns, it is necessary to bring the planes of polarization of the comparison beam and the digit beams into coincidence, and this is accomplished by rotating the polarization of the comparison beam by 90° by means of half-wave plate R.

Thus, it can be seen that the selective energization of the Pockels cells determines whether or not an extraordinary ray (digit beam) will emerge from each of the respective control devices, thereby controlling which ones of the individual diffraction grating patterns will appear in the composite interference pattern imaged on film F.

Further, it should be noted that, as is well known, all of the radiation which enters the birefringent device (except for small absorption and reflection losses) emerges therefrom as an ordinary and/or extraordinary ray. (See Jenkins and White, "Fundamentals of Optics," 3rd ed.: "Section 24.10 Polarization by Double Refraction.") Therefore, regardless of any change in the degree of energization of the Pockels cells and the resulting changing intensities of the various ordinary and extraordinary rays, the disclosed system is theoretically 100% efficient in that all of the source beam from laser L is used to expose film F at all times. That is, regardless of the combination of "0" and "1" bits in a digital numeral being recorded (indicated by the presence or absence of the various extraordinary rays and their respective interference patterns at the recording area), the full intensity of the laser beam impinges upon film F for every numeral, and the integrated density of the film pattern remains relatively constant.

The Pockels cells of FIG. 1 could be replaced by any device which selectively changes the polarization of the light passing through it, such as a Kerr cell or a Faraday cell. The plane parallel birefrigent plates of FIG. 1 could be replaced by Rochon prisms if mirrors M1 to M7 were slightly rotated so that the extraordinary beams would be reflected to mirrors M'1 to M'7.

Of course, the combination of the two mirrors MC and M'C could be replaced by a rhombic prism, which would make the system easier to adjust since the system would be less sensitive to movement.

Figure 2:
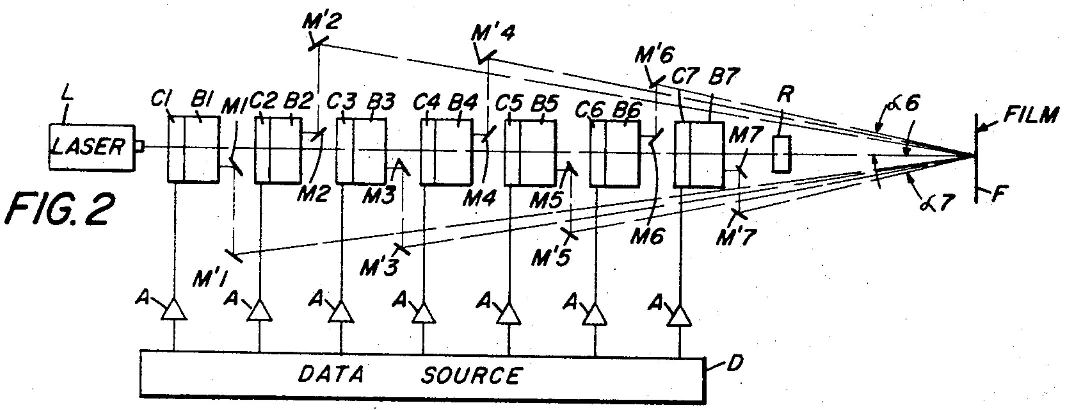
FIG. 2 is a modification of the apparatus of FIG. 1 in which the source to pattern distance has been considerably shortened.

FIG. 2 shows a device which is similar to FIG. 1 but wherein each birefrigent plate is rotated 180° from the previous one. This permits the distance from the source to the interference pattern to be shortened since the optical modulating units can be placed closer together without the extroardinary ray from any one unit hitting the mirror of the next unit. As in FIG. 1, the Pockels cells could be replaced by any device which selectively changes the polarization, and the birefringent plates could be replaced by any device which separates a polarized beam into two components.

Of course, each of the mirror combinations M1M'1, M2M'2, etc., could be replaced by a suitable rhombic prism.

Figure 3:
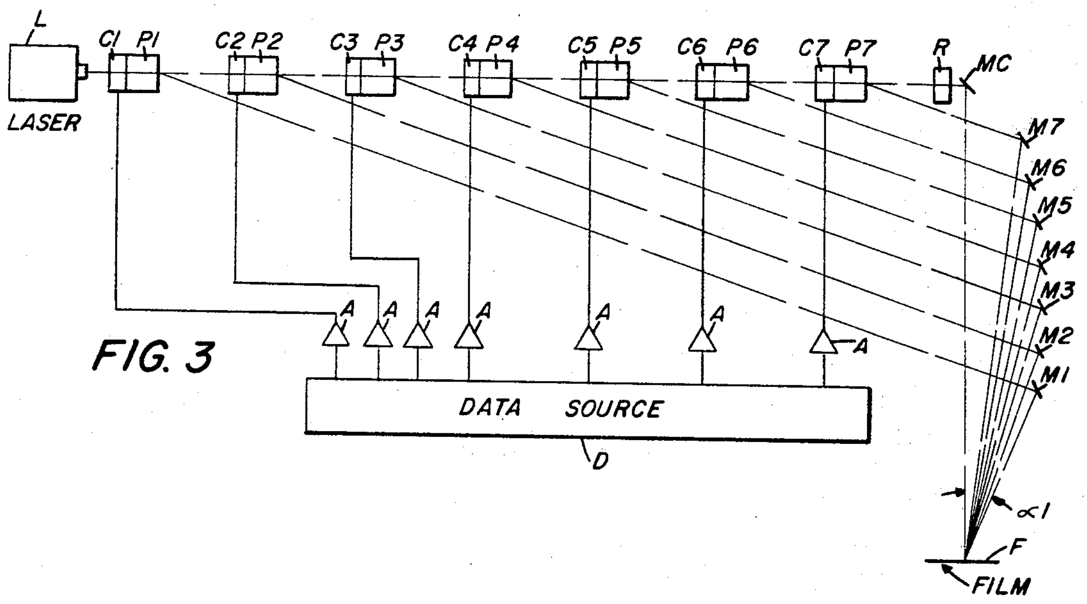
FIG. 3 shows an embodiment of the invention using Rochon prisms.

FIG. 3 shows an embodiment of the invention in which the birefringent devices P1 to P7 are Rochon prisms. Note that in this arrangement only half as many mirrors are used.

Figure 4:
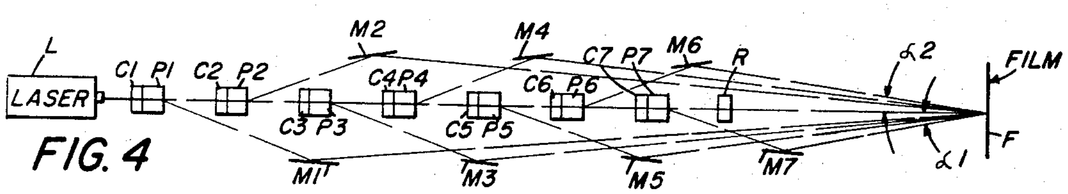
FIG. 4 is a modification of FIG. 3 in which the source to pattern distance has been shortened in a manner analogous to FIG. 2.

FIG. 4 shows an embodiment which is similar to that shown in FIG. 3 but in which each Rochon prism is arranged to direct its extraordinary ray to the opposite side of its ordinary ray from that of the previous prism. As discussed when describing the embodiment of FIG. 2 this arrangement shortens the distance from the source to the interference pattern.

Figure 5:
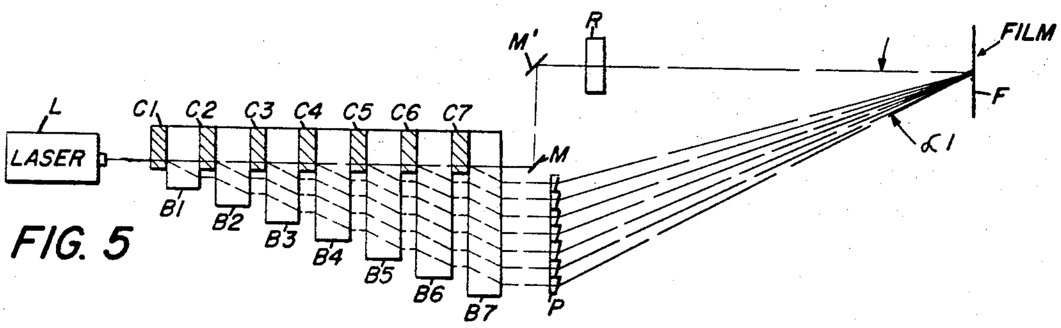
FIG. 5 shows schematically an embodiment where each of the birefringent plates acts on all of the radiation from the previous control devices.

FIG. 5 shows an embodiment wherein the ordinary ray coming from each birefringent device travels through all of the succeeding control devices, each of which consists of a Pockels cell C1 to C7, and a birefringent device B1 to B7. However, the Pockels cells are arranged so that the extraordinary rays pass only through the birefringent devices. Thus the comparison beam comes straight through all of the control devices, is reflected by mirrors M and M' through half wave plate R to the film F. The digital beams go through each succeeding birefringent device, where they are deflected downward an increment for each diffraction. The result is up to seven spaced digital beams which are refracted toward the film by prism array P.

Figure 6:
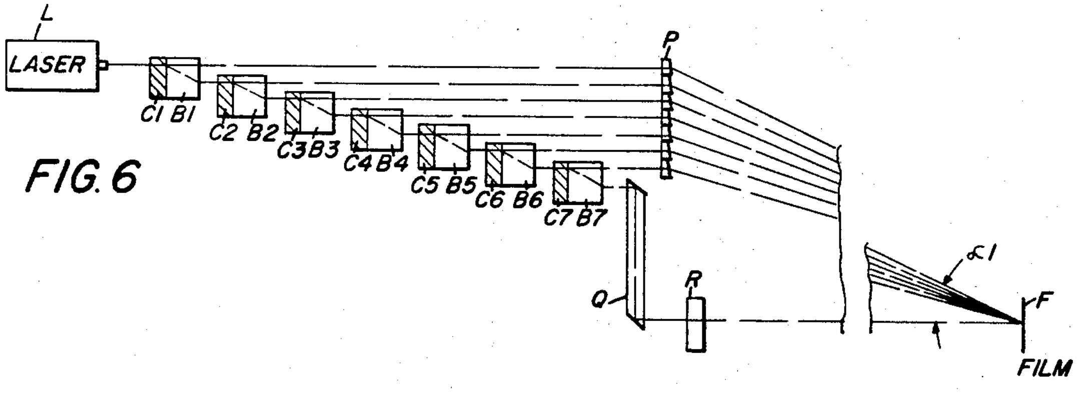
FIG. 6 shows an embodiment of the invention which is analogous to FIG. 1 and uses the principles of FIG. 5.

FIG. 6 shows an embodiment similar to that of FIG. 5, but which uses smaller birefringent devices. Here the Pockels cells and birefringent plates are arranged so that when the Pockels cell is deenergized the ordinary ray of the birefringent plate is cut off, sending all of the beam along the extraordinary ray. The ordinary rays are diffracted toward the film F by prism array P. The comparison beam, which is the extraordinary ray from birefringent plate B7 is refracted by rhombic prism Q toward the film F to interfere wtih the digital beams. Of course, half wave plate R is necessary for the beams to interfere. The driver amplifiers and data source are not shown in FIGS. 4 to 6, but it is understood that they are necessary to the operation of these embodiments, and would be similar to those in FIGS. 1 to 3.

In general, in order to get an interference pattern of maximum contrast it is desirable to adjust the voltages applied to the Pockels cells so that approximately half of the light from the laser is in the comparison beam and the other half is equally distributed among the digital beams.

For example, to record, the digital numeral "1111111," each of the Pockels cells C1–C7 (FIG. 1) would be energized by its associated amplifier to cause a portion of the source beam to be passed through each birefringent plate B1–B7 as an extraordinary ray so that the composite grating pattern imaged on film F would include the seven individually-distinct line patterns created by the interference of each of the seven data beams with the comparison beam. However, in order to assure that each of the seven interference patterns would be recorded at approximately equal densities on film F, it is obvious that the selective energization of each of the Pockels cells must be varied to cause their respective birefringent plates to pass extraordinary rays of approximately equal intensity.

As noted above, if cell C1 were to pass a beam polarized 45° from the crystal axis of plate B1, one half of the total intensity of the laser beam would appear in its extraordinary ray, leaving only the remaining half of the source beam to be divided into the remaining six extraordinary beams and the comparison beam. Therefore, it is apparent that cell C1 would be energized in such a manner that the elliptical polarization of its emergent beam would result in the division of the beam by plate B1 into an extraordinary beam comprising only a small portion (e.g., 1/10) of the intensity of the source beam, the remaining intensity (e.g., 9/10) being passed in its ordinary ray on to cell C2. Similarly, the other cells C2–C7 would be selectively energized to polarize their respective incoming portions of the source beam so that the small portions of it which pass through their respective plates B2–B7 as extraordinary rays will be of approximately equal intensity (e.g., the extraordinary rays passed by plates B2–B7 might comprise, respectively, 1/9, 1/8, 1/7, 1/6, 1/5 and 1/4 of the remaining source beam).

It should be apparent that the intensities of the data beams would be similarly equalized for all other numerals recorded. For instance, when recording the composite grating pattern corresponding to the numeral "1001001," cells C2, C3, C5 and C6 would be energized in such a manner that their emergent rays would be polarized in the direction of the crystal axes of their respective birefringent plates, and the entire intensity of the beam would be passed as the ordinary ray. At the same time, the energization of cells C1, C4 and C7 would be selected so that their respective plates would pass extraordinary beams perhaps comprising, respectively, 1/5, 1/4 and 1/3 of the remaining intensity of the source beam. In this manner, the absence of extraordinary rays from plates B2, B3, B4 and B6 would result in the absence of their respective interference patterns, indicating "0" values, and the resulting composite interference pattern would include three individually-distinct line grating patterns of approximately equal intensity created by the interference of the comparison beam (comprising approximately 40% of the source beam) and the three data beams (each comprising approximately 20% of the source beam).

The system would still work as described if a Wollaston prism were used instead of a Rochon prism or a plane parallel birefringent plate. And, as stated above, the Pockels cells could be replaced by any device which selectively changes the polarization of a beam such as a Kerr cell or a Faraday cell.

I claim:

1. Apparatus for producing a composite diffraction grating pattern on a radiation-sensitive recording medium located at a predetermined position relative to said apparatus, said composite pattern comprising a plurality of effectively superimposed line gratings of individually-distinct spatial frequency, said apparatus comprising:

- means for generating a source beam of effectively coherent radiation,
- a plurality of control means, each including:
  - first means for selectively reorienting said source beam, and
  - second means for dividing said source beam into two emergent beams, the relative intensity of said emergent beams being responsive to said selective reorientation of said source beam, and
- means for directing said emergent beams along separate but intersecting paths so that pairs of said emergent beams interfere to form respective line grating patterns of individually-distinct spatial frequencies at said predetermined recording position.

2. Apparatus according to claim 1 wherein the integrated intensity of all said emergent beams remains substantially constant at all times.

3. Apparatus according to claim 1 wherein all of said source beam is passed serially through each said control means.

4. Apparatus according to claim 1 wherein each said first means selectively reorients the polarization of said source beam and said second means includes a birefringent device, said apparatus further comprising means for reorienting the polarization of said emergent beams into correspondence with each other.

5. Apparatus according to claim 4 in which each of said first means comprises one of the group consisting of a Pockels cell, a Faraday cell, and a Kerr cell.

6. Apparatus according to claim 4 in which the birefringent device is one of the group consisting of a plane parallel birefringent plate, a Rochon prism, and a Wollaston prism.

7. Apparatus according to claim 1 wherein at least a portion of said source beam is passed serially through each said control means.

8. Apparatus according to claim 7 wherein said control means are serially positioned so that said portion of the source beam passes therethrough in a straight line.

9. Apparatus according to claim 8 wherein the separate path for one emergent beam from each control means is oppositely disposed, relative to said straight line, to the corresponding path of the next serially positioned control means.

References Cited

UNITED STATES PATENTS

| | | | |
|---|---|---|---|
| 2,770,166 | 11/1956 | Gabor | 350—12 |
| 3,256,524 | 6/1966 | Stauffer | 346—76 |
| 3,312,955 | 4/1967 | Lamberts et al. | 340—173 |

RICHARD B. WILKINSON, *Primary Examiner.*

J. W. HARTARY, *Assistant Examiner.*